(12) United States Patent
Kim

(10) Patent No.: US 9,489,022 B2
(45) Date of Patent: Nov. 8, 2016

(54) MEMORY APPARATUS AND COMPUTER SYSTEM INCLUDING THE SAME

(71) Applicant: SK hynix Inc., Icheon-si Gyeonggi-do (KR)

(72) Inventor: Kwang Hyun Kim, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 209 days.

(21) Appl. No.: 14/100,860

(22) Filed: Dec. 9, 2013

(65) Prior Publication Data

US 2015/0067315 A1    Mar. 5, 2015

(30) Foreign Application Priority Data

Aug. 30, 2013    (KR) .................. 10-2013-0103806

(51) Int. Cl.
*G06F 1/24* (2006.01)

(52) U.S. Cl.
CPC ...................................... *G06F 1/24* (2013.01)

(58) Field of Classification Search
CPC .............. G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | | |
|---|---|---|---|---|
| 3,331,986 A * | 7/1967 | Hardin | .................. | F02P 3/0884 123/651 |
| 4,694,431 A * | 9/1987 | Miyamura | ........... | G11C 7/1048 365/104 |
| 4,860,122 A * | 8/1989 | Kanamaru | ........... | H04N 1/2104 386/241 |
| 5,530,676 A * | 6/1996 | Sullivan | .................... | G11C 8/18 365/189.05 |
| 5,867,676 A | 2/1999 | Nguyen et al. | | |
| 6,101,162 A * | 8/2000 | Kim | ....................... | G06F 3/0619 369/124.1 |
| 6,654,847 B1 * | 11/2003 | Roohparvar | ........ | G06F 12/0607 711/100 |
| 2003/0093445 A1* | 5/2003 | Schick | ............... | H04N 1/00132 |
| 2003/0115427 A1* | 6/2003 | Roohparvar | ............ | G11C 7/02 711/154 |
| 2006/0291280 A1* | 12/2006 | Roohparvar | ............. | G11C 7/20 365/185.01 |
| 2007/0014176 A1* | 1/2007 | Krenzke | ................ | G11C 16/30 365/226 |
| 2007/0070792 A1* | 3/2007 | Jang | ...................... | G11C 7/1051 365/189.16 |
| 2007/0097759 A1* | 5/2007 | Chen | ....................... | G11C 16/08 365/194 |
| 2011/0199831 A1* | 8/2011 | Roohparvar | ........ | G11C 11/5628 365/185.18 |
| 2012/0117368 A1* | 5/2012 | Itoh | ...................... | G06F 9/4406 713/2 |
| 2012/0272050 A1* | 10/2012 | Seo | ..................... | G06F 11/1417 713/2 |
| 2013/0051132 A1* | 2/2013 | Son | ......................... | G11C 7/24 365/158 |
| 2013/0238887 A1* | 9/2013 | Xu | ........................ | G06F 9/4401 713/2 |
| 2013/0258781 A1* | 10/2013 | Goda | ................. | G11C 16/3418 365/185.17 |
| 2014/0112082 A1* | 4/2014 | Lee | .......................... | G11C 7/20 365/189.011 |
| 2014/0197688 A1* | 7/2014 | Yu | ............................ | G06F 1/30 307/39 |

* cited by examiner

*Primary Examiner* — Thomas Lee
*Assistant Examiner* — Mohammad A Rahman
(74) *Attorney, Agent, or Firm* — William Park & Associates Ltd.

(57) ABSTRACT

A semiconductor device includes a memory bank, a data line and a data line control unit. The memory bank stores data. The data line transfers data to be stored in or output from the memory bank. The data line control unit initializes the data line in response to a power-up signal and a write command.

12 Claims, 4 Drawing Sheets

MEMORY APPARATUS AND COMPUTER SYSTEM INCLUDING THE SAME

CROSS-REFERENCE TO RELATED APPLICATION

The present application claims priority under 35 U.S.C. §119(a) to Korean application number 10-2013-0103806, filed on Aug. 30, 2013 in the Korean Intellectual Property Office, which is incorporated by reference herein in its entirety.

BACKGROUND

1. Technical Field

Various embodiments relate to a semiconductor device, and more particularly, to a semiconductor device and a computer system including the same.

2. Related Art

A computer system performs a booting operation in order to initialize when supplied power. The booting operation can be divided into a cold booting operation and a warm booting operation depending on whether power to the computing system was previously cut-off. The cold booting may refer to a booting operation where the computer system is powered up and restarts itself after power to the computer system has been completely cut-off. Warm booting may refer to a booting operation where the computer system restarts itself when power to the computer system has not been previously cut-off.

The cold booting operation has different booting sequences from those of the warm booting operation. During the cold booting operation, a processor accesses a read-only memory (ROM), moves a basic input/output system (BIOS) information from the ROM to non-ROM memory and reads the BIOS information stored in the non-ROM memory for restarting the computer system. During the warm booting operation, the processor reads the BIOS information stored in non-ROM memory for restarting the computer system without access to the ROM. Because in a warm booting operation the computer system restarts when power has not been lost, the BIOS information remains in non-ROM memory. Non-ROM memory has faster access speed than that of the ROM and therefore makes the booting operation faster.

Further, during the warm booting operation the processor reads and compares an ID value stored in non-ROM memory and ROM. The ID value may be part of the BIOS information for performing the booting operation. When the ID value stored in the non-ROM memory and ROM are equal, the processor reads data stored in non-ROM memory for performing the booting operation. When the ID value stored in non-ROM memory and the ROM are not equal, the processor reads the BIOS information stored in the ROM for performing the booting operation.

There may be unintended errors during the booting operation as a computer system is developed and versions of the BIOS information keeps changing. For example, there may be an error in which the processor performs the warm booting operation with the BIOS stored in non-ROM memory when the computer system should be reading BIOS from ROM as part of a cold booting operation.

SUMMARY

A semiconductor device capable of preventing unnecessary data output during a booting operation and a computer system including the same are described herein.

A semiconductor device in accordance with an embodiment of the present invention may include a memory bank configured to store data; a data line configured to transfer data to be stored in or outputted from the memory bank; and a data line control unit configured to initialize the data line in response to a power-up signal and a write command.

A memory device in accordance with an embodiment of the present invention may include a memory bank configured to store data; a data line configured to transfer data to be stored in or outputted from the memory bank; a reset signal generator configured to generate a reset signal in response to a power-up signal and a write command; and a data line driving unit configured to drive the data line in response to the data and the reset signal.

A computer system in accordance with an embodiment of the present invention may include a processor; a read-only memory (ROM) configured to provide a basic input/output system (BIOS) information to the processor; a memory device configured to communicate with the processor and store the BIOS information; and a power supply unit configured to provide a power to the processor, the ROM and the memory device, wherein the memory device prevents the BIOS information from being outputted when the power is supplied from the power supply unit after a cut-off of the power.

BRIEF DESCRIPTION OF THE DRAWINGS

Features, aspects, and embodiments are described in conjunction with the attached drawings, in which.

DETAILED DESCRIPTION

Hereinafter, a semiconductor device and a system including the same according to the present disclosure will be described below with reference to the accompanying drawings through various embodiments.

Figure 1:
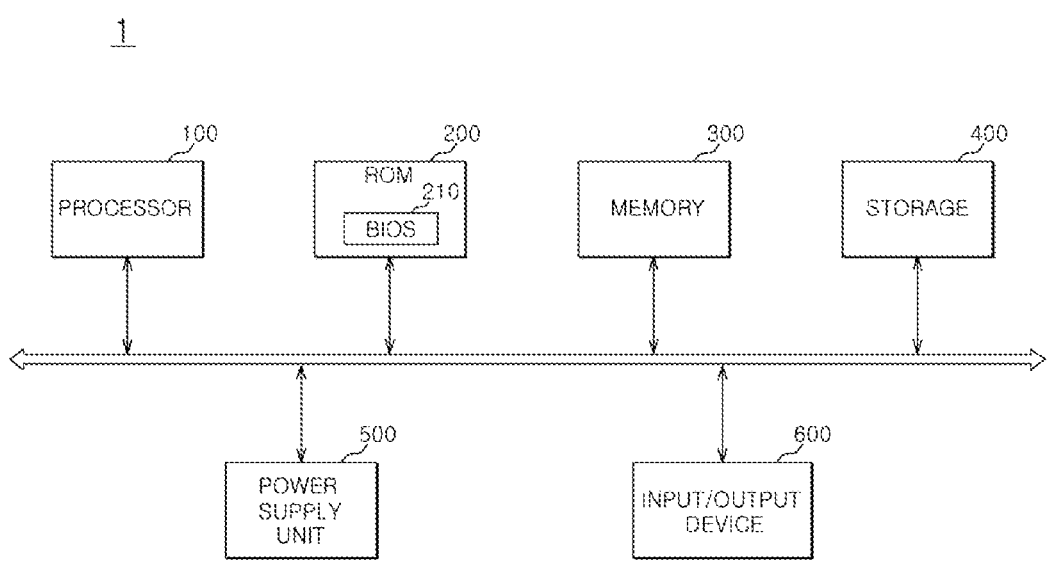
FIG. 1 is a block diagram illustrating a computer system in accordance with an embodiment of the present invention.

The computer system 1 shown in FIG. 1 is simplified for clear description. The computer system 1 may be an electronic device such as a desktop computer, a laptop computer, a mobile phone, an electronic notebook, a portable audio player, a camera. The computer system 1 may include a processor 100, a ROM 200, a memory apparatus 300, a storage device 400, a power supply unit 500 and an input/output device 600.

The processor 100 may perform various operations such as executing a software program. The processor 100 may include a command bus, an address bus, and a data bus. The processor 100 may provide the memory device 300 with a command, an address signal and data through the buses. Also, the processor 100 may perform booting operations for the computer system 1 in communication with the ROM 200 and the memory device 300. The ROM 200 may store BIOS information 210 and provide the processor 100 with the BIOS information 210 during the booting operation.

The memory device 300 may communicate data with the processor 100 in support of input and output operations. The memory device 300 may provide data received from the processor 100 to the storage device 400 to be stored therein. The memory device 300 may output data stored in the storage device 400 to the processor 100. The memory device 300 may serve as a buffer transferring data between the processor 100 and the storage device 400. The memory device 300 may include a volatile memory device such as a dynamic random access memory (DRAM), or the memory device 300 may include a nonvolatile memory device such as a flash memory, a phase change random access memory (PCRAM), a resistive random access memory (ReRAM), a ferroelectric random access memory (FeRAM), a magnetic random access memory (MRAM) and a Spin Transfer Torque random access memory (STTRAM). In some examples, the memory device 300 may comprise a combination of the volatile memory device and the nonvolatile memory device.

The storage device 400 may include a nonvolatile memory device such as the flash memory, the PCRAM, the ReRAM, the FeRAM, the MRAM and the STTRAM; and the storage device 400 may be in the disk form, such as, a hard disk driver (HDD), a compact disk read only memory (CDROM), a digital versatile disk (DVD) or a solid state disk (SSD). In other examples, the storage device 400 may be of a card type, such as, an universal serial bus (USB) memory, a secure digital (SD) card, a mini secure digital (MSD) card, a micro SD card, a secure digital high capacity (SDHC) card, a memory stick card, a smart media (SM) card, a multi-media card (MMC), an embedded MMC (eMMC) or a compact flash (CF) card.

The power supply unit 500 may provide the computer system 1 with power for operations of each of the elements in the computer system 1. The power supply unit 500 may include a power management circuit for effectively managing power consumption of the computer system 1. The input/output device 600 may be connected to and interact with the processor 100. The input/output device 600 may include such input devices as a keyboard, a keypad, a mouse, a touch pad, a touch screen, a stylus, a microphone and so forth; and such output devices as a monitor, a screen, a speaker, an earphone, a printer, a video terminal and so forth.

The processor 100 may perform a plurality of booting operations according to whether power from the power supply unit 500 is cut-off. The processor 100 may perform a booting operation in one of a first booting operation mode and a second booting operation mode according to whether power supplied from the power supply unit 500 to the computer system 1 has been cut-off since a previous boot operation. In the first booting operation mode, the computer system 1 restarts itself without power being cut-off to the computer system 1. In the second booting operation mode, the computer system 1 is powered up and restarts itself after power to the computer system 1 has been completely cut-off. The first booting operation mode may be a mode for the warm booting operation and the second booting operation mode may be a mode for the cold booting operation.

The processor 100 in the second booting operation mode may move the BIOS information 210 from the ROM 200 to the memory device 300 and read the BIOS information from the memory device 300. The memory device 300 may store the BIOS information 210 into preset memory cells of a memory bank and the processor 100 may provide the memory device 300 with a read command and an address signal for reading the BIOS information 210 stored in the memory device 300, which will be described later.

The processor 100 in the first booting operation mode may read part of the BIOS information stored in the memory device 300 and part of the BIOS information 210 stored in the ROM 200. The part of the BIOS information may include ID values. The processor 100 may compare an ID value read from the memory device 300 with an ID value read from the ROM 200. When the ID values read from the memory device 300 and the ROM 200 are equal, the processor 100 reads the BIOS information stored in the memory device 300 to perform the booting operation. When the ID values read from the memory device 300 and the ROM 200 are not equal, the processor 100 reads the BIOS information 210 stored in the ROM 200 to perform the booting operation.

The memory device 300 may output the BIOS information stored therein to the processor 100 based on whether power to the computer system 1 is cut-off. The memory device 300 in the first booting operation mode may output a part or all of the BIOS information stored therein to the processor 100. The memory device 300 in the second booting operation mode does not output the BIOS information stored therein to the processor 100.

In an embodiment, when an error occurs in which the processor 100 is performing the first booting operation mode when the computer system 1 should be performing the second booting operation mode, the memory device 300 does not output the BIOS information stored therein to the processor 100 thereby preventing an error of booting sequences.

Figure 2:
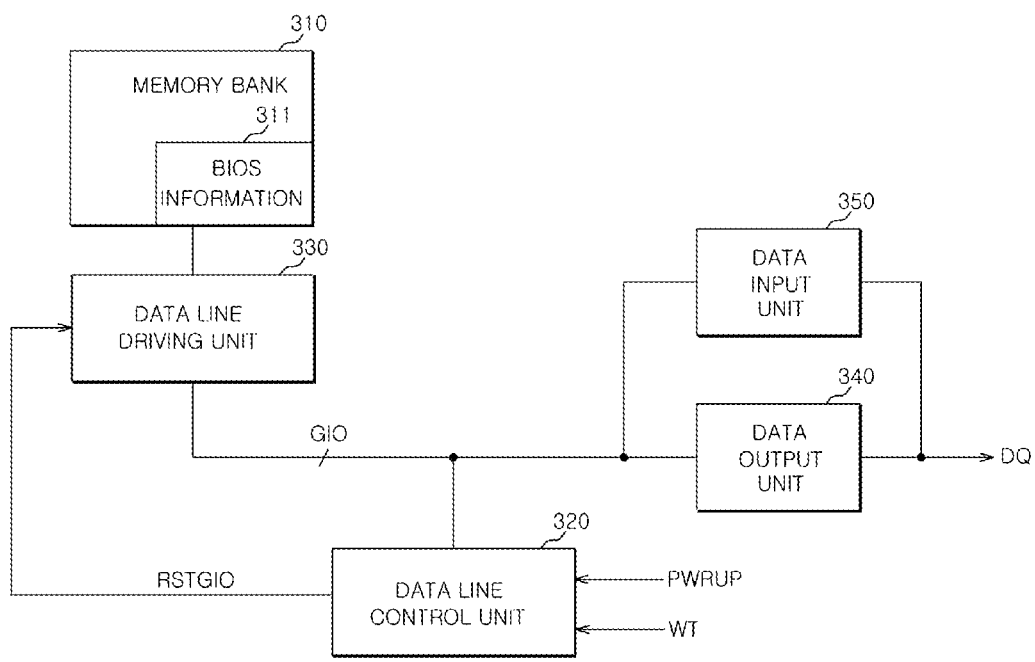
FIG. 2 is a block diagram illustrating a memory device in accordance with an embodiment of the present invention.

FIG. 2 is a block diagram illustrating the memory device 300 in accordance with an embodiment of the present invention.

Referring to FIG. 2, the memory device 300 may include a memory bank 310, a data line GIO and a data line control unit 320. The memory bank 310 may include a plurality of memory cells and store data received from external devices. A part of the plurality of memory cells of the memory bank 310 may be configured to store a part or all the BIOS information 311.

Data to be stored into or to be output from the memory bank 310 may be transferred through the data line GIO.

The data line control unit 320 may initialize the data line GIO in response to a power-up signal PWRUP and a write command WT. The power-up signal PWRUP may be generated in the memory device 300 or provided by the processor 100. The power-up signal PWRUP may be generated or provided based on whether power to the computer system has been cut-off. For example, the power-up signal PWRUP may be generated or provided when the computer system 1 is powered-up after power to the computer system 1 has been cut-off. The power-up signal PWRUP may pulse and be enabled when the power reaches a preset level and the power-up signal PWRUP may be disabled after enablement of the power-up signal PWRUP. The power-up signal PWRUP, thus, will not be generated or provided again without the power being cut-off, which makes the power-up signal PWRUP an indicator of whether the first booting operation or the second booting operation should be performed.

The write command WT may be provided by the processor 100 for storing data into the memory device 300 received from the external devices.

The data line control unit 320 may initialize the data line GIO in response to an enablement of the power-up signal PWRUP and keep the data line GIO initialized until input of the write command WT.

The memory device 300 may prevent data output by initializing the data line GIO through the data line control unit 320 in response to an enablement of the power-up signal PWRUP. The memory device 300 in the second booting operation mode may prevent the data stored in the memory bank 310 from being outputted to the processor 100.

The data line control unit 320 may generate a reset signal RSTGIO in response to the power-up signal PWRUP and the write command WT. The data line control unit 320 also may set a voltage level of the data line GIO to a preset level in response to the reset signal RSTGIO.

The memory device 300 may further include a data line driving unit 330.

The data line driving unit 330 may drive the data line GIO according to data stored in the memory bank 310. The data line driving unit 330 may receive the data outputted from the memory bank 310, and output the amplified data to the data line GIO. The data line driving unit 330 may be disabled in response to the reset signal RSTGIO. In response to an enablement of the reset signal RSTGIO, the data line driving unit 330 does not drive the data line GIO even though the data line driving unit 330 may receive data outputted from the memory bank 310.

The memory device 300 may further include a data output unit 340 and a data input unit 350.

The data output unit 340 may amplify data transferred through the data line GIO and output the amplified data to the external devices through a data pad DQ. The data input unit 350 may amplify data input through the data pad DQ and output the amplified data through the data line GIO.

Figure 3:
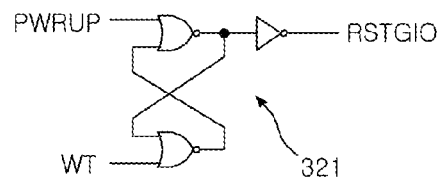
FIG. 3 is a circuit diagram illustrating a data line control unit shown in FIG. 2.
Figure 3:
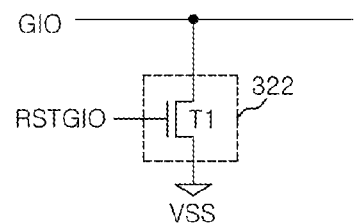

FIG. 3 is a circuit diagram illustrating the data line control unit 320 shown in FIG. 2.

Referring to FIG. 3, the data line control unit 320 may include a reset signal generator 321 and a reset driver 322.

The reset signal generator 321 may include an SR latch. The SR latch may generate the reset signal RSTGIO based on the power-up signal PWRUP and the write command WT. The reset signal generator 321 may enable the reset signal RSTGIO in response to the enablement of the power-up signal PWRUP and disable the reset signal RSTGIO in response to enablement of the write command WT.

The reset driver 322 may include a first transistor T1 connected to the data line GIO. There may be more than one data line GIO and the reset driver 322 may include a plurality of transistors. The number of transistors included in the reset driver 322 may correspond to the number of data lines GIO.

The first transistor T1 may be an NMOS transistor, and may have a gate receiving the reset signal RSTGIO, a drain connected to the data line GIO, and a source connected to a ground voltage VSS. The first transistor T1 may be turned on when the reset signal RSTGIO is enabled and drive the data line GIO with the ground voltage VSS. The reset driver 322 may set the voltage level of the data line GIO to the preset level in response to enablement of the reset signal RSTGIO.

Figure 4:
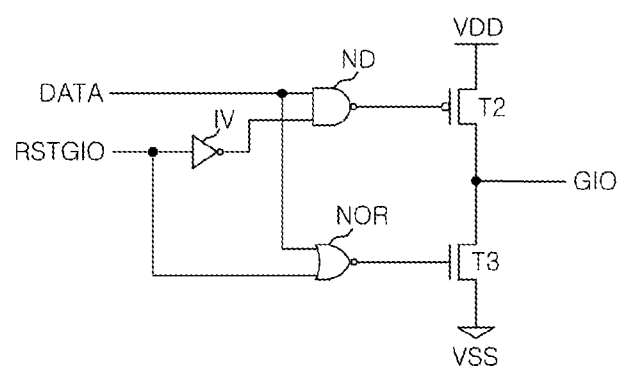
FIG. 4 is a circuit diagram illustrating a data line driving unit shown in FIG. 2.

FIG. 4 is a circuit diagram illustrating the data line driving unit 330 shown in FIG. 2.

Referring to FIG. 4, the data line driving unit 330 may include an inverter IV, a NAND gate ND, a NOR gate NOR, a second transistor T2 and a third transistor T3.

The inverter IV may invert the reset signal RSTGIO. The NAND gate ND may receive data DATA, which may be output from the memory bank 310, and an output of the inverter IV. The NAND gate ND may output a signal having a high level in response to the enablement of the reset signal RSTGIO with a high level. The NAND gate ND may output a signal having either high level or low level based on a logic level of data DATA when the reset signal RSTGIO is disabled with a low level.

The NOR gate NOR may receive the data DATA and the reset signal RSTGIO. The NOR gate NOR may output a signal having a low level in response to the enablement of the reset signal RSTGIO with a high level. The NOR gate NOR may output a signal having either high level or low level based on a signal level of data DATA when the reset signal RSTGIO is disabled with a low level.

The second transistor T2 may be a PMOS transistor and a gate of the PMOS transistor may receive the output of the NAND gate ND. A drain of the second transistor T2 may be connected to the data line GIO, and a source of the second transistor T2 may be connected to a power voltage VDD. The second transistor T2 may drive the data line GIO with the power voltage VDD when the output of the NAND gate ND has a low level, or when the reset signal RSTGIO is disabled with a low level and data DATA has a high level.

The third transistor T3 may be an NMOS transistor. A gate of the third transistor T3 may receive the output of the NOR gate NOR. A drain of the third transistor T3 may be connected to the data line GIO, and a source of the third transistor T3 may be connected to the ground voltage VSS. The third transistor T3 may drive the data line GIO with the ground voltage VSS when the output of the NOR gate NOR has a high level, or when the reset signal RSTGIO is disabled with a low level and data DATA has a low level.

The second and the third transistors T2 and T3 are turned off when the reset signal RSTGIO is enabled with a high level. The data line driving unit 330 may be disabled in response to the enablement of the reset signal RSTGIO. The data line driving unit 330 may not drive the data line GIO in response to the enablement of the reset signal RSTGIO.

Figure 5:
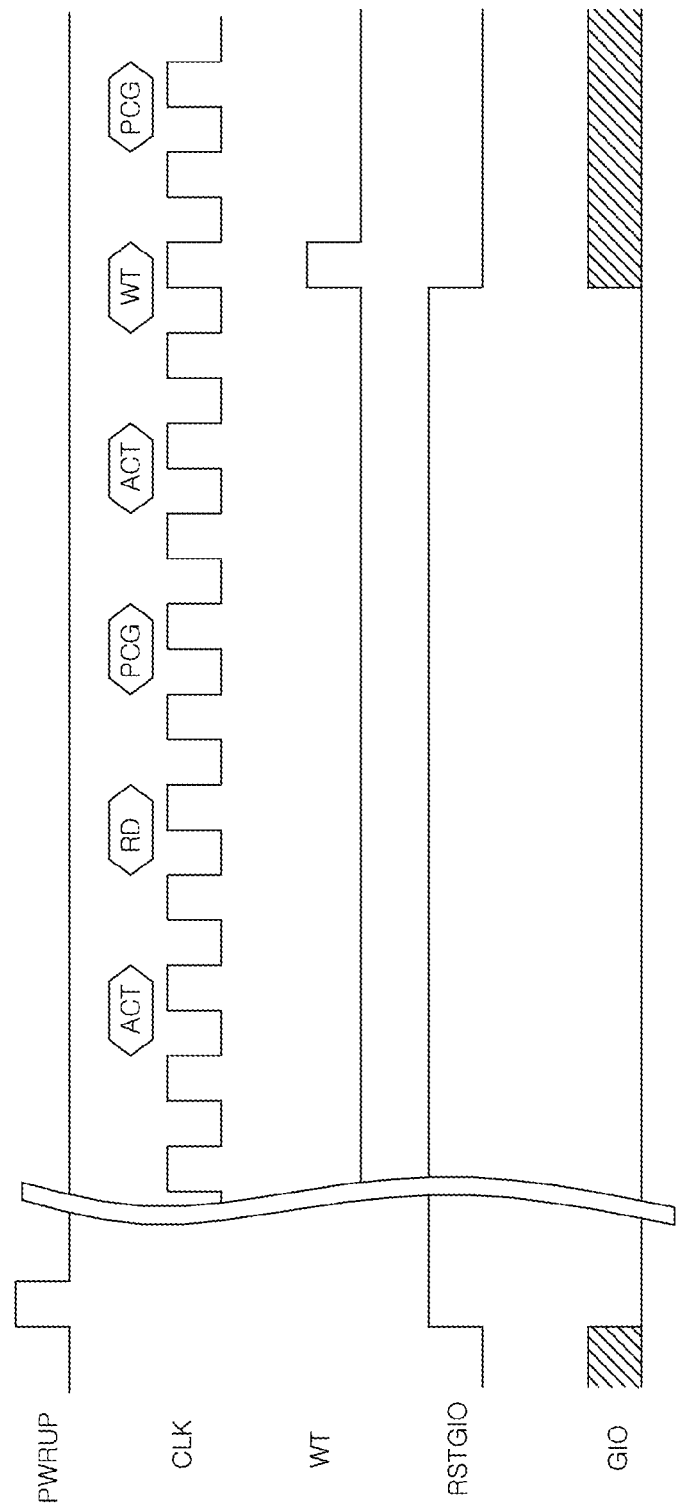
FIG. 5 is a timing diagram illustrating operations of a memory device and a computer system in accordance with an embodiment of the present invention.

FIG. 5 is a timing diagram illustrating operations of the memory device 300 and the computer system 1 in accordance with an embodiment of the present disclosure.

With reference to FIGS. 1 to 5, the operations of the memory device 300 and the computer system 1 in accordance with an embodiment of the present disclosure will be described.

The power-up signal PWRUP may pulse once at power-up of the computer system 1 after power from the power supply unit 500 to the computer system 1 has been cut-off. When the power-up signal PWRUP pulses, the data line control unit 320 may enable the reset signal RSTGIO and set the voltage level of the data line GIO to the preset level. The data line driving unit 330 may be disabled in response to the reset signal RSTGIO.

Assuming a scenario in which power from the power supply unit 500 to the computer system 1 has been cut-off. If an error occurs in which the processor 100 tries to perform the booting operation in the first booting operation mode when the computer system 1 should perform the second booting operation mode, the processor 100 may provide the memory device 300 with a read command RD and an address signal (not illustrated) to read the BIOS information 311 stored in the memory device 300. The processor 100 may provide an active command ACT first to access the memory device 300 and a precharge command PCG to exit the access.

The memory device 300 may output the BIOS information 311 based on the read command RD and the address signal received from the processor 100. However, the memory device 300 does not drive the data line GIO because the data line driving unit 330 is disabled in response to the reset signal RSTGIO. Also, the reset driver 322 may set the voltage level of the data line GIO to the preset level in response to the reset signal RSTGIO.

The processor 100 will receive data outputted from the memory device 300 after provision of the read command RD. However, the data outputted from the memory device 300 is set to the preset level and thus the IDs read from the memory device 300 and the ROM 200 are not equal. Because the IDs read from the memory device 300 and the ROM 200 are not equal, the processor 100 performs the booting operation by reading the BIOS information 210 stored in the ROM 200.

While certain embodiments have been described above, it will be understood to those skilled in the art that these embodiments have been described for illustrative purposes. Accordingly, the semiconductor device and the computer system including the same described herein should not be limited to the described embodiments. Rather, the semiconductor device and the computer system including the same described herein should be understood in light of the following claims when taken in conjunction with the above description and accompanying drawings.

What is claimed is:

1. A semiconductor device comprising:
   a memory bank configured to store data;
   a data line configured to transfer data to be stored in or outputted from the memory bank;
   a data line control unit configured to initialize the data line in response to a power-up signal and keep the data line initialized until a write command is inputted; and
   a data line driving unit configured to drive the data line according to data outputted from the memory bank, the data line driving unit is disabled in response to a reset signal.

2. The semiconductor device of claim 1, wherein the memory bank stores a part or all of information for system booting.

3. The semiconductor device of claim 1, wherein the data line control unit includes:
   a reset signal generator configured to generate the reset signal in response to the power-up signal and the write command; and
   a reset driver configured to set the data line to a preset voltage level in response to the reset signal.

4. The semiconductor device of claim 1, wherein the power-up signal is generated according to whether power is cut-off to the semiconductor device.

5. The semiconductor device of claim 1 further comprising a memory device configured to output basic input/output system (BIOS) information based on whether power to the computer system is cut-off.

6. A memory device comprising:
   a memory bank configured to store data;
   a data line configured to transfer data to be stored in or outputted from the memory bank;
   a reset signal generator configured to enable a reset signal in response to a power-up signal, and disable the reset signal in response to a write command; and
   a data line driving unit configured to drive the data line in response to the data and the reset signal,
   wherein the data line driving unit drives the data line according to the data and is disabled in response to an enablement of the reset signal.

7. The memory device of claim 6, further comprising a reset driver configured to set the data line to a preset voltage level in response to the reset signal.

8. The memory device of claim 6, wherein the memory device is configured to output basic input/output system (BIOS) information based on whether power to the computer system is cut-off.

9. A computer system comprising:
   a processor;
   a read-only memory (ROM) configured to provide a basic input/output system (BIOS) information to the processor;
   a memory device configured to communicate with the processor and store the BIOS information; and
   a power supply unit configured to provide a power to the processor, the ROM and the memory device,
   wherein the memory device prevents the BIOS information stored therein from being outputted when the power is supplied from the power supply unit after a cut-off of the power,
   wherein the memory device provides the processor with the BIOS information during booting operation when power from the power supply unit has not been cut-off,
   wherein the memory device comprises a memory bank configured to store the BIOS information, a data line configured to transfer data to be stored in or outputted from the memory bank, a data line control unit configured to prevent the BIOS information stored in the memory bank from being outputted to the processor in response to a power-up signal and a write command, and a data line driving unit configured to drive the data line according to data stored in the memory bank,
   wherein the data line driving unit is disabled in response to a reset signal.

10. The computer system of claim 9, wherein the power-up signal is generated according to whether power from the power supply unit has been cut-off.

11. The computer system of claim 9, wherein the data line control unit is configured to initialize the data line in response to an enablement of the power-up signal and keeps the data line initialized until the write command is inputted.

12. The computer system of claim 9, wherein the data line control unit includes:
    a reset signal generator configured to generate the reset signal in response to the power-up signal and the write command; and
    a reset driver for setting the data line to a preset level in response to the reset signal.

* * * * *